United States Patent [19]

Fukuhara et al.

[11] Patent Number: 4,672,382
[45] Date of Patent: Jun. 9, 1987

[54] POSITION MEASURING SYSTEM

[75] Inventors: Hiroshige Fukuhara, Yokosuka; Hideo Takai, Yokohama; Yasuyuki Uekusa; Hisao Kishi, both of Yokosuka, all of Japan

[73] Assignee: Nissan Motor Co., Ltd., Yokohama, Japan

[21] Appl. No.: 804,512

[22] Filed: Dec. 4, 1985

[30] Foreign Application Priority Data

Dec. 7, 1984 [JP] Japan .................................. 59-257484

[51] Int. Cl.$^4$ .......................... G01S 5/02; H04B 7/185
[52] U.S. Cl. ..................................... 342/357; 342/451
[58] Field of Search ............... 343/352, 357, 451, 458; 364/449, 451

[56] References Cited

U.S. PATENT DOCUMENTS 3,941,984  3/1976  Chappell et al. .................... 343/357

OTHER PUBLICATIONS

P. S. Jorgensen, "Navstar/Global Positioning System 18-Satellite Constellations", Journ. of the Inst. of Navigation, vol. 27, pp. 89–100.

Primary Examiner—Theodore M. Blum
Assistant Examiner—Gregory C. Issing
Attorney, Agent, or Firm—Schwartz, Jeffery, Schwaab, Mack, Blumenthal & Evans

[57] ABSTRACT

An improved position measuring system for determining a vehicle's position by receiving radio waves emitted from satellites is shown. The system adopts successive approximation using a convergent computation, in which initially estimated values are computed.

7 Claims, 6 Drawing Figures

POSITION MEASURING SYSTEM

BACKGROUND OF THE INVENTION

The present invention relates to a position measuring system utilizing the global positioning system (abbreviated as GPS in what follows).

A positioning measuring system for vehicle, in the broad sense of the form, operates by receiving radio waves from satellites, for example, four satellites with an antenna. In the system navigational data of the waves are analyzed to determine the three-dimensional coordinates of a vehicle having the system. Broadly speaking, the determining process has been accomplished by convergently computing values of the vehicle's position from initial estimated values to truthful values, so the initial estimated value must be input, for example, manually. This is troublesome and inconvenient for drivers.

SUMMARY OF THE INVENTION

An object of the invention is to provide a position measuring system in which data of a vehicle's position are automatically obtained in a short time.

Another object of the invention is to provide a position measuring system in which data of a vehicle's position are automatically obtained without mannualy inputting initial data.

These and other objects and advantages are accomplished by providing a position measuring system using succesive approximation on the basis of navigational data in which an initial approximation or estimated value is automatically obtained.

DESCRIPTION OF THE PREFERRED EMBODIMENTS

Figure 1:
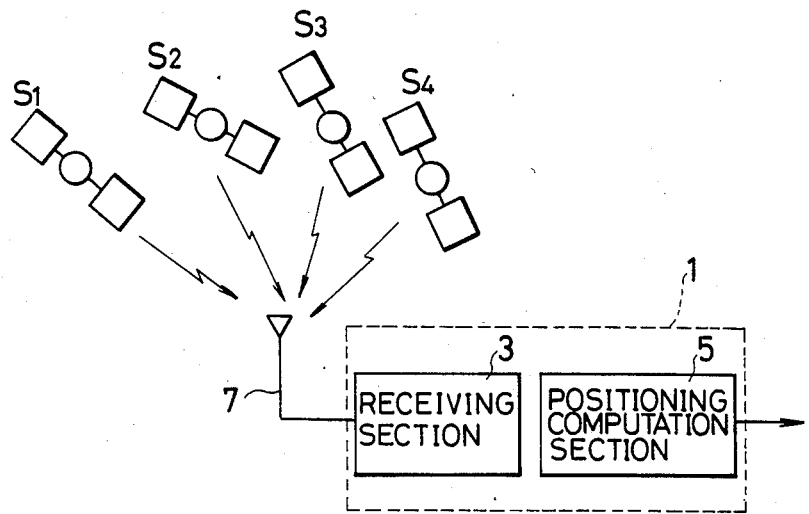
FIG. 1 is a block diagram for the position measuring system according to the prior art.

To facilitate the understanding of the present invention, a brief reference will be made to the prior art illustrated in FIGS. 1 and 2.

A position measuring system 1 includes a receiving section 3 and a positioning computation section 5, and determines the receiving position (position of the vehicle) by receiving radio waves from satellite $S_i$ (i=1-4) with an antenna 7, analyzing navigational data from each satellite carried on the radio waves, and carrying out computation.

What is meant by the navigational data here is the three-dimensional positional information for each satellite, including, in the broader sense, information on the transmission timing of the positional information. In general, the distance between the receiving position and each of the satellites can be determined by multiplying the propagation delay time $T_i$ which is determined by detecting the reception timing by the use of a clock that is built in the receiving section 3 by the velocity of light (c=300,000 km/sec). Ideally, navigational data from at least three satellites is needed to obtain the three-dimensional coordinates of the receiving position 3. However, of the existence in reality of an offset time (deviation from the absolute time) ST in the clock, there is added one more unknown, so that it becomes necessary to have navigational data from four satellites to determine the three-dimensional coordinates of the receiving position.

In FIG. 1, the receiving section 3 receives the navigational data as a high frequency signal which is spectrally diffused by the PN coding, and the positional information for the satellite and the information on the transmission timing are obtained by decoding the PN coding. The position determination computation section 5 determines the receiving position by carrying out the position determination computation that will be described below based on the information obtained above.

Figure 2:
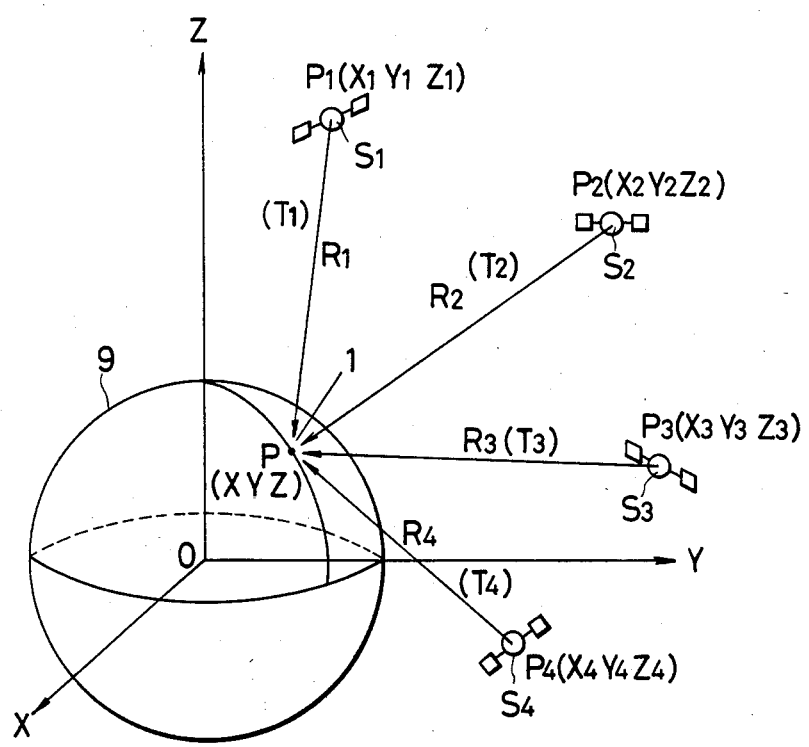
FIG. 2 is an explanatory configuration diagram for illustrating the prior art technique.

Now, suppose in a rectangular coordinate system with the center 0 of the earth 9 as the origin, as shown in FIG. 2, the position measuring system 1 is located at a position P (X,Y,Z) on the surface of the earth 9 and the satellite $S_i$ (i=1-4) is located at a position $P_i$ ($X_i, Y_i, Z_i$) Assume that the position measuring system aboard a vehicle receives navigational data from each of the satellites $S_i$, and also the positions $P_i$ of the satellites and the true propagation delay times $T_i$ for the navigational data.

The true distance $R_i$ (i=1-4) between the position measuring system 1 and the satellite $S_i$ is represented by the following.

$$R_i = c \cdot T_i = \sqrt{(X - X_i)^2 + (Y - Y_i)^2 + (Z - Z_i)^2} \quad (1)$$

In the above expression c is the light velocity and $T_i$ is the true propagation delay time for each navigational data.

However, the propagation delay time actually measured $T_i'$ includes a deviation in the clock (offset time T) as given by the ralation $$T_i' = T_i + \delta T \quad (2)$$

so that the distance actually measured $R_i'$ between the position measuring system 1 and the satellite Si is given by $$R_i' = c \cdot T_i' = c \cdot (T_i + \delta T) = R_i + c \cdot \delta T \quad (2)$$
$$= \sqrt{(X - X_i)^2 + (Y - Y_i)^2 + (Z - Z_i)^2} + c \cdot \delta T$$

In the above equation X,Y,Z, and T represent unknown quantities.

Then, it becomes possible to determine the vehicle position P(X, Y, Z), of the vehicle from a set of four-dimensional simultaneous equations obtained by setting i=1-4 in Eq. (3).

However, because the actual computation is carried out by the use of a microcomputer, what is generally done is to converge estimated values for the position to the true position in a manner as will be described below, instead of actually solving the set of four-dimensional simultaneous equations that involve quadratic expressions for the unknowns X,Y, and Z.

Namely, first a set of estimated values for the position Pe ($X_e, Y_e, Z_e$) and the offset time $\delta T_e$ are input manually to the positioning computation section 5.

By calling the errors between the estimated values and the true values by $\Delta X$, $\Delta Y$, $\Delta Z$, and $\Delta \delta T$, the relationship among them are given by the following equations.

$$X = X_e + \Delta X \quad Y = Y_e + \Delta Y \quad (4)$$
$$Z = Z_e + \Delta Z \quad T = \delta T_e + \Delta \delta T.$$

If the estimated distance $R_{ie}$ (i=1-4) between the satellite and the vehicle is computed from Eq. (3) in terms of the estimated values $X_e$, $Y_e$, and $Z_e$ for the position and the estimated value $\delta T_e$ for the offset time $\delta T$, the result will be given by the following.

$$R_{ie} = \sqrt{(X_e - X_i)^2 + (Y_e - Y_i)^2 + (Z_e - Z_i)^2} + c \cdot \delta T_e. \quad (5)$$

If the difference between the estimated distance thus obtained and the actually measured value $R_i'$ as given by Eq. (3) is called $\Delta R_i$, one has $$R_i' = R_{ie} + \Delta R_i \quad (6)$$

It is to be noted that $\Delta R_i$ can be determined since it is the difference between the estimated distance $R_{ie}$ given by Eq. (5) and the actually measured distance.

On the other hand, by substituting Eq. (4) into the right-hand side of Eq. (3) one obtains $$R_i' = |\{(X_e + \Delta X - X_i)^2 + \quad (7)$$
$$(Y_e + \Delta Y - Y_i)^2 + (Z_e + \Delta Z - Z_i)^2\}^{\frac{1}{2}}| +$$
$$c \cdot \delta T_e + c \cdot \Delta \delta T,$$

so that by Taylor expanding the above and by neglecting infinitesimal terms beyond the second order there is obtained the following (omitting the details of the deriviation).

$$R_i' = \sqrt{(X_e - X_i)^2 + (Y_e - Y_i)^2 + (Z_e - Z_i)^2} \times 1 + \quad (8)$$
$$\frac{(X_e - X_i) \cdot X + (Y_e - Y_i) \cdot Y + (Z_e - Z_i) \cdot Z}{(X_e - X_i)^2 + (Y_e - Y_i)^2 + (Z_e - Z_i)^2} +$$
$$c \cdot \delta T_e + c \cdot \Delta \delta T$$

By substituting Eqs. (5) and (6) into Eq. (8) and rearranging one obtains $$\Delta R_i = (X_e - X_i)/(R_{ie} - c \cdot \delta T_e) \cdot \Delta X + \quad (9)$$
$$(Y_e - Y_i)/(R_{ie} - c \cdot \delta T_e) \cdot \Delta Y +$$
$$(Z_e - Z_i)/(R_{ie} - c \cdot \delta T_e) \cdot \Delta Z + c \cdot \Delta \delta T$$

Equation (9) shows that the difference $\Delta R_i$ between the estimated distance $R_{ie}$ given by Eq. (5) and the actually measured distance $R_i'$ can be given as the resultant of the product of the error $\Delta \delta T$ in the estimated offset time and the velocity of light added to the sum of the product of each of the errors $\Delta X$, $\Delta Y$, and $\Delta Z$ in the estimated values and the respective corresponding directional cosines of the unit vector along the direciton from the estimated position to the satellite. It is seen that the errors $\Delta X$, $\Delta Y$, and $\Delta Z$ in the estimated position and the error $\Delta \delta T$ in the estimated value of the offset time can be found by solving a set of first order four-dimensional simultaneous equations that can be obtained by setting i=1-4 in Eq. (9) .

Then, the errors thus found are added to the estimated values to obtain a new set of estimated values, and this operation is iterated until the errors converge to the predetermined infinitesimal values to obtain the true position of the vehicle and the offset time of the clock. This is the conventional method of the convergent computation.

However, in an existing position measuring system of the above kind, the estimated values for the receiving position and the offset time of the clock have to be input manually through keyboard or the like, which requires the user to have a specialized knowledge for inputting these values. In addition, even if the user happens to have sufficient knowledge, the procedure is extremely troublesome, making the use of the system inconvenient.

Figure 3:
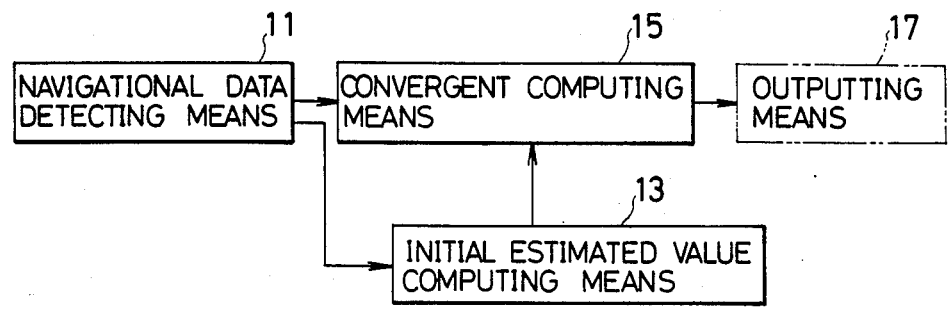
FIG. 3 is a block diagram of a position measuring system in accordance with the present invention.

Referring to Fig.3, brief configuration of the present invention is shown. In the figure, navigational data detecting means 11 detects the navigational data by receiving radio waves emitted by a satellite. Initial estimated value computing means 13 which computes the approximate values for the receiving position based on the navigational data detected by the navigational data detecting means 11 and outputs the approximate values thus computed as an initial set of estimated values. Convergent computing means 15 which receives the initial estimated values from the initial estimated value computing means 13 as well as the navigational data from the navigational data detecting means 11, and causes the initial estimated values to converge to the true position that is defined by the navigational data. In the figure, outputting means 17 provides the data concerning the receiving position that is determined by the convergent computation at the convergent computing means to be input to a route guidance unit.

With a special provision of the initial estimated value computing means 13, it becomes possible to compute automatically the data concerning the receiving position as well as to supply the approximate values of the receiving position thus computed to the convergent computing means 15 as initial estimated values, so that an automatic inputting of the estimated values is arranged.

Figure 4:
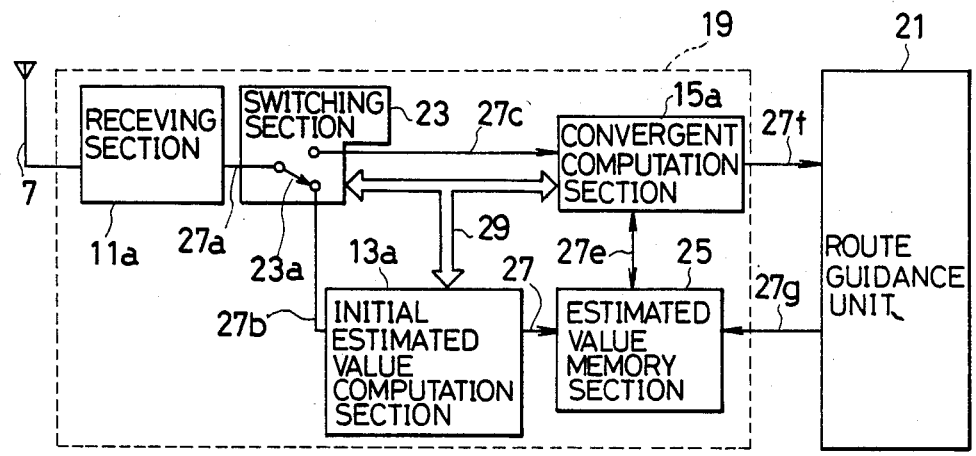
FIG. 4 is a block diagram which illustrates an embodiment of the position measuring system.

In FIG. 4 an embodiment of the position measuring system shown is being used in combination with a route guidance unit.

In FIG. 4, an antenna 7 is the same as shown in the example for the prior art. A position measuring system 19 includes a receiving section 11a, a switching section 23, an initial estimated value computation section 13a, an estimate value memory section 25, and a convergent computation section 15a. The reference numerals 27a-27e are data circuits, and 29 is a timing circuit (control bus).

The receiving section 11a is a concrete realization of the navigational data detecting means 11 of FIG. 3, and its function is similar to the receiving section 3 explained in connection with FIG. 1. The initial estimated value computation section 13a is a concrete realization of the initial estimated value computing means 13 of FIG. 3, and its function will be described in detail later.

The convergent computation section 15a is a concrete realization of the convergent computing means 15 of FIG. 3, and its function is approximately similar to the positioning computation section 5 of FIG. 1.

In addition, the switching section 23 in FIG. 4 provides the navigational data from the circuit 27a to 27b or 27c by switching, where the switching is carried out by the timing command from the timing circuit 29. Further, the estimated value memory section 25 stores the approximate values of the receiving position (vehicle position) that is computed at the initial estimated value computation section 13a, and gives the memory content (initial estimated values) to the convergent computation section 15a at a predetermined timing. Moreover, the estimated value memory section 25 is constructed in such a way as to make it possible to receive and store the current position which is processed by the convergent computation section 15a or a route guidance unit 21 through the circuit 27e or the circuit 27g, and to give the stored values to the convergent computation section 15a as the initial estimated values at the time the vehicle is started.

Furthermore, the route guidance unit 21 is appropriately equipped with an inertial navigation system which is a combination of a vehicle speed sensor and an optical gyro, and carries out the guiding operation of the vehicle while receiving, as needed, accurate positional information from the position measuring system 19.

In the position measuring system 19 of the above construction, when the power source is connected, the main computer which is not shown determines the initial condition, and determines whether or not appropriate initial estimated values for the present are input to the estimated value memory section 25. When initial estimated values are already input to the estimated value memory section 25, as for instance, when the current position of the vehicle that is at rest has been stored as described earlier, these will be output to the convergent computation section 15a as initial estimated values. On the contrary, if there are no input initial estimated values stored in the estimated value memory section 25, the change-over switch 23a of the switching section 23 is closed to connect the circuit 27b to give the navigational data received by the receiving section 11a to the initial estimated value computation section 13a.

The computational processing at the initial estimated value computation section 13a is as follows.

Figure 5:
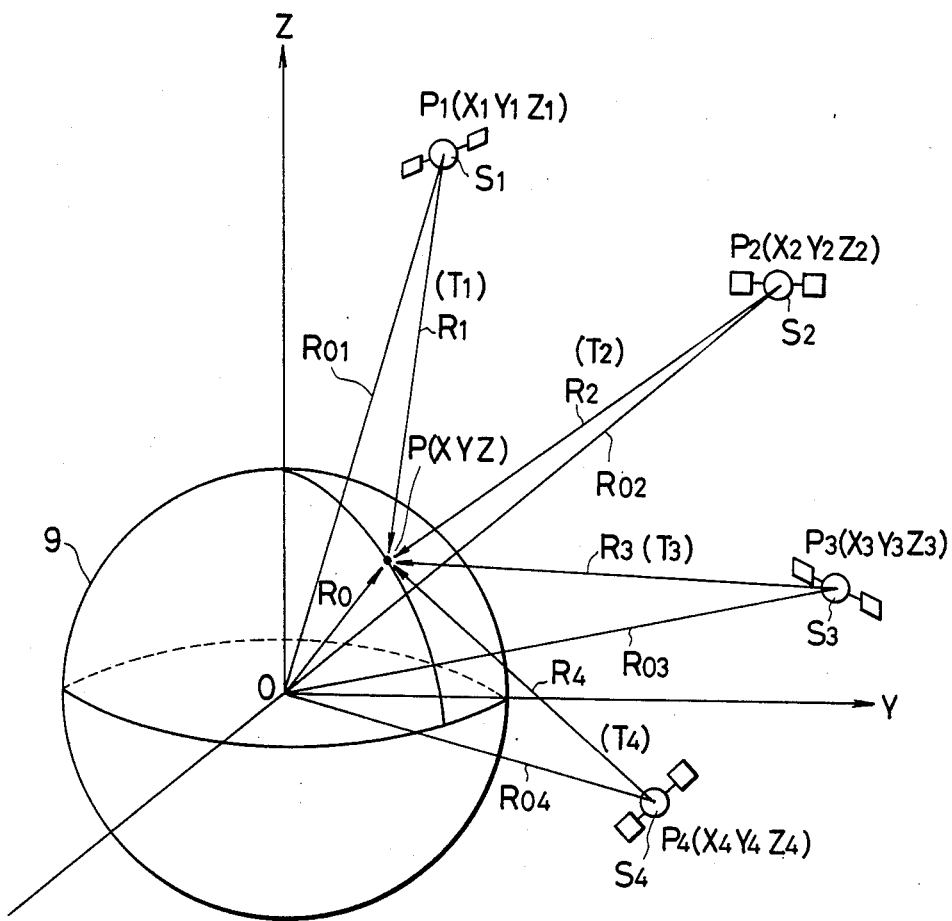
FIG. 5 is an explanatory configuration diagram which illustrates the relationship among a plurality of satellites and the receiving (vehicle) position.

Analogous to FIG. 2, consider a rectangular coordinate system with the center 0 of the earth 9 as the origin. Let the position of the vehicle on the earth's surface be represented by a vector P (X,Y,Z), the positions of the four satellites (i=1−4) by a vector $P_i$ $(X_i, Y_i, Z_i)$, the (true) propagation delay time of the navigational data received by each satellite by $T_i$, and the (true) distance between each satellite $S_i$ and the vehicle by $R_i$. The geometry is shown again in FIG. 5. Further, let it be assumed that the built-in clock of the position measuring system 19 possesses an offset time $\delta T$ as in the example for the prior art.

First, the actually measured distance $R_i'$ between each of the satellites $S_i$ and the vehicle is given by Eq. (3) as shown earlier.

$$R_i' = \sqrt{(X - X_i)^2 + (Y - Y_i)^2 + (Z - Z_i)^2} + c \cdot \delta T \quad (3)$$

By rearrangement of the terms in the radical one obtains $$R_i' = \sqrt{(X^2 + Y^2 + Z^2) + (X_i^2 + Y_i^2 + Z_i^2) - 2(XX_i + YY_i + ZZ_i)} + c \cdot \delta T \quad (10)$$

$$= \sqrt{R_o^2 + R_{oi}^2 - 2(XX_i + YY_i + ZZ_i)} + c \cdot \delta T$$

to the center 0 of the earth and $R_{oi}$ is the distance between the satellite and the center 0.

In Eq. (10), $R_i'$ and $R_{oi}$ are quantities that can be measured and, $R_o$ may be regarded as the radius (about 6380 km) of the earth, so that it will be seen that the approximate values for the vehicle position P(X,Y,Z) can be determined by solving a set of four-dimensional simultaneous equations obtained by setting i=1−4 in Eq. (10). It should be noted that since the object here is to obtain approximate values, the orbit radius of the satellites (about 25,560 km) may be used for the distance $R_{oi}$ between each of the satellite $S_i$ and the center 0 of the earth.

Now, the set of four-dimensional simultaneous equations obtainable from Eq. (10) involves second order terms in the unknown $\delta T$ so that solving the set directly by the use of a microcomputer which is employed for these various computations is not so simple. Therefore, the following approach is adopted instead.

That is, first, the following equation is obtained by rearrangiung Eq. (10).

$$R_i' = \sqrt{R_o^2 + R_{oi}^2} \cdot \sqrt{1 - \frac{2(XX_i + YY_i + ZZ_i)}{R_o^2 + R_{oi}^2}} + c \cdot \delta T \quad (11)$$

Then, by Taylor expanding the factor $$\sqrt{1 - \frac{2(XX_i + YY_i + ZZ_i)}{R_o^2 + R_{oi}^2}}$$

of Eq. (10) (this will be referred to as factor a hereafter) and discarding terms higher than the second order, Eq. (10) becomes $$R_i' = \sqrt{R_o^2 + R_{oi}^2} \cdot \left(1 - \frac{XX_i + YY_i + ZZ_i}{R_o^2 + R_{oi}^2}\right) + c \cdot \delta T \quad (12)$$

$$= \sqrt{R_o^2 + R_{oi}^2} - \frac{XX_i + YY_i + ZZ_i}{\sqrt{R_o^2 + R_{oi}^2}} + c \cdot \delta T$$

By multiplying both sides of Eq. (12) by $$\sqrt{R_o^2 + R_{oi}^2}$$

which is called $K_i$ (i=1−4) one obtains $$XX_i + YY_i + ZZ_i - K_i c \delta T = K_i^2 - R_i' K_i \quad (13)$$

In the above equation, $X_i, Y_i$ and $Z_i$ are known from the navigational data and so is $K_i^2 = R_o^2 + R_{oi}^2$ and further, the velocity of light c is known and the distance $R_i'$ between each satellite $S_i$ and the vehicle can be actually measured, so that a set of four-dimensional first order equations obtainable from Eq. (13) can be solved for the unknowns X,Y,Z, and δT.

The approximate values of X,Y,Z, and δT for the vehicle position thus obtained are stored temporarily at the estimated value memory section 25 of FIG. 2, and are retrieved by the convergent computation section 15a, whenever occasion calls for the next step of the convergent computation. The method of convergent computation is similar to that described in connection with the prior art.

Now, the approximate values obtained from Eq. (13) in the above manner will carry large errors due to first order approximation if the second term (called term b hereafter)

$$\frac{2(XX_i + YY_i + ZZ_i)}{R_o^2 + R_{oi}^2}$$

in the Taylor expansion of Eq. (10) is not sufficiently small compared with unity. If the approximate values determined by Eq. (12) are used as they are, the possibility will arise that the convergent computation at the convergent computation section 15a may become divergent or that a large amount of computing time may have to be consumed.

Therefore, a measure for preventing the errors in the approximate values that are based on the first order approximation of Eq. (14) from becoming too large will now be described.

The error ε in the first order approximation $1-\beta/2$ of $\sqrt{1-\alpha}$ is $$\epsilon = \sqrt{1-\alpha} - (1-\alpha/2). \tag{14}$$

Here, by identifying the term b of Eq. (10), namely, $$\frac{2(XX_i + YY_i + ZZ_i)}{R_o^2 + R_{oi}^2}$$

as $\alpha_i$, the error $\epsilon_i$ in term b will be determined for each satellite due to the first order approximation by substituting the vehicle position X,Y, and Z that is computed in the first round of operation.

$$\epsilon_i = \sqrt{1-\alpha_i} - (1-\alpha_i/2). \tag{15}$$

Further, the offset time δT obtained in the first round of computation is called a constant term $\delta T_o$, and it will be assumed that there will be an error εδT included also in the offset time.

Correcting Eq. (11) in terms of the error $\epsilon_i$ due to the first order approximation and the error εδT mentioned above, one obtains $$R_i' = \sqrt{R_o^2 + R_{oi}^2} \left(1 - \frac{XX_i + YY_i + ZZ_i}{R_o^2 + R_{oi}^2}\right) + c(\delta T + \epsilon \delta T). \tag{16}$$

Analogous to the previous operation, by multiplying both sides of Eq. (16) by $K_i$ where $K_i^2 = R_o^2 + R_{oi}^2$, and by rearranging one as obtain $$XX_i + YY_i + ZZ_i - C\epsilon \delta T K_i = (1+\epsilon_i) K_i^2 + \delta T K_i^2 - R_i K_i^2 \tag{17}$$

Therefore, now values for the unknown vehicle position X,Y, and Z and the error εδT for the offset time can be found anew by solving a set of four-dimensional simultaneous equations that can be obtained from Eq. (17) by setting the errors $\epsilon_i$ and εδT. Here, the new offset time will be given by $\delta T_o + \epsilon \delta T$.

By iterating the computation like in the above, it becomes possible to eliminate the errors due to first order approximation to the Taylor expansion. The evaluation as to whether or not the result of the computation is sufficient to be used as approximate values can be made, for instance, according to the following.

Namely, the evaluation of the approximate values for the vehicle position can be made by examining whether or not the value of $X^2 + Y^2 + Z^2$ evaluated by using the results of the operation falls within the tolerable range $\epsilon R_o$ with respect to the true value $R_o$ of the earth's radius, and also whether or not the offset time δT obtainable from the results of the operation falls within the tolerable range ωδT. Appropriate approximate values for the vehicle position X,Y, and Z may be obtained by iterating the operation which uses Eqs. (14) and (17) until the results of the computation fall within the range of tolerable values.

Figure 6:
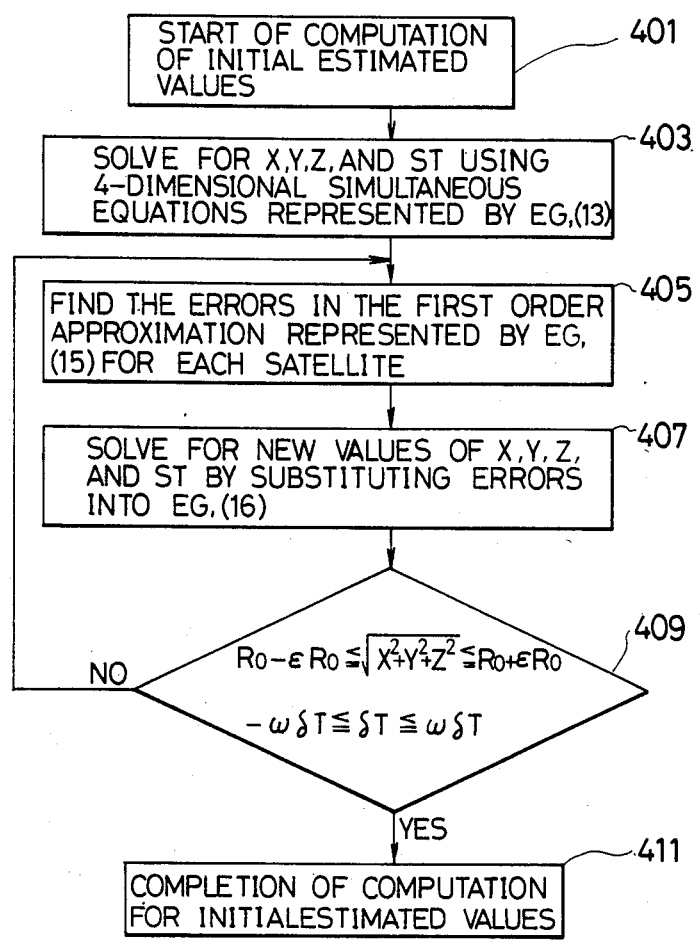
FIG. 6 is a flow chart for the computational processings to be carried out at the initial estimated value computation section 13a shown in FIG. 4.

The operational processing of the approximate values for the vehicle position described in the foregoing is summarized in a flow chart given by FIG. 6.

As shown in FIG. 6, the computation for the initial estimated values, that is, the computation of the approximate values, for the vehicle position is started in step 401.

In step 403, the navigational data from each satelite $S_i$ is input, and approximate values of X,Y, and Z for the vehicle position and the offset time δT are found from a set of four-dimensional simultaneous equations that follow from Eq. (12).

Next, after finding errors $\epsilon_i$ in the first approximation given by Eq. (14) in step 405, it proceeds to step 407 where new approximate values X,Y,Z, and δT are found by solving a set of four-dimensional simultaneous equations according to Eq. (17).

Then, in step 409, whether the new approximate values X,Y, and Z for the vehicle position satisfy the relation $$R_o - \epsilon R_o \leq \sqrt{X^2 + Y^2 + Z^2} < R_o + \epsilon R_o, \tag{18}$$

namely, whether the earth radius evaluated as the result of computation agrees with the true value (set value) of the earth radius within the tolerable range of $\epsilon R_o$, and also whether the newly obtained offset time δT falls within the tolerable range of δT, namely, whether it satisfies $$-\omega \delta T \leq \delta T \leq \omega \delta T, \tag{19}$$

are evaluated.

The processing in steps 405–409 are iterated until Eqs. (18) and (19) are satisfied in step 409. Processing then continues to step 411 with the values of X,Y,Z, and δT thus evaluated as the initial estimated values.

The estimated value memory section 25 stores the final set of the estimated values as the initial estimated values.

Subsequent to the above, the switch 23a of the switching section 23 is closed to connect the receiving station 11a to the convergent computation section 15a, and the convergent computation as described in connection with the prior art is excuted to obtain the true vehicle position and the offset time in the clock.

It should be mentioned that although in the correction represented by Eq. (17) the errors $\epsilon_i$ for the first order approximation were estimated by Eq. (14), the correction may be made instead by multiplying the approximate values X,Y, and Z for the vehicle position that are obtained by the first round of operation by a weighting factor defined by $$k = \frac{R_o}{\sqrt{X^2 + Y^2 + Z^2}}. \quad (20)$$

That is, one may regard kX, kY, and kZ as the corrected values for the vehicle position.

Here, the weighting factor k has a physical significance of contracting or expanding the magnitude of the vehicle position vector as determined by the first round of computation, having its starting point at the earth's center 0, with its direction fixed.

According to the correction system that uses such a weighting factor it becomes possible to reduce the computing time since the correction requires a simple operational equation as shown by Eq. (20).

According to the present invention described in the foregoing in conjunction with a preferred embodiment, it becomes possible to provide an easy to operate position measuring system which is capable of automatically inputting the estimated values of the receiving position that are computed automatically, without requiring manual inputting of the data for its use.

Various modifications will become possible for those skilled in the art after receiving the teachings of the present disclosure without departing from the scope thereof.

What is claimed is:

1. A position measuring system for a vehicle comprising:
    means for detecting navigational data by receiving radio waves emitted by satellites;
    switching means having a change-over switch connected to said detecting means;
    first computing means connected to the change-over switch for computing initial estimated values of the vehicle's position on the basis of the navigational data when said change-over switch is in a first position;
    memory means for storing the initial estimated values calculated in the first computing means; and
    second computing means connected to said change-over switch and said memory means for convergently computing the true position of the vehicle based on the initial estimated values and the navigational data when said change-over switch is in a second position, wherein said first position indicates that the initial estimated values have not been stored in said memory means and said second position indicates that the initial estimated values have been stored in said memory means.

2. A position measuring system as claimed in claim 1 system, further comprising a timing cirucit for performing proper operational timing between the switching means, the first computing means and the second computing means.

3. A position measuring system as claimed in claim 1, wherein the initial estimated values are derived from the equation, $$XX_i + YY_i + ZZ_i - K_i \cdot c \cdot \delta T = K_i^2 - R_i' \cdot K_i (i=1, 2, 3, 4)$$

wherein
X, Y, Z: coordinates corresponding to the position of the vehicle
$X_i, Y_i, Z_i$: coordinates corresponding to the position of the satellites
$K_i$: sum of the radius of the earth and the distance between the satellite and the center of the earth
$\delta T$: deviation in the clock of the system
$R_i'$: measured distance between the satellite and the vehicle
C: speed of light.

4. A position measuring system as claimed in claim 1, wherein the estimated value is repeatedly computed by the equation, $$XX_i + YY_i + ZZ_i - c\epsilon\delta T \cdot K_i = (1 + \epsilon_i)K_i^2 + \cdot \delta T \cdot K_i^2 -$$

$$R_i' K_i^2$$

$$\epsilon_i = \sqrt{1 - \frac{2(XX_i + YY_i + ZZ_i)}{K_i^2}} -$$

$$\left(1 - \frac{XX_i + YY_i + ZZ_i}{K_i^2}\right)$$

wherein
X, Y, Z: coordinates corresponding to the position of the vehicle
$X_i, Y_i, Z_i$: coordinates corresponding to the position of the satellites
$K_i$: sum of the radius of the earth and the distance between the satellite and the center of the earth
$\delta T$: deviation in the clock of the system
$R_i'$: measured distance between the satellite and the vehicle
C: speed of light
$\epsilon$: an error.

5. A position measuring system as claimed in claim 4, wherein the estimated values are repeatedly computed until they satisfy the inequality equation $$R_o - \epsilon R_o \leq \sqrt{X^2 + Y^2 + Z^2} \leq R_o + \epsilon R_o$$

and until it is determined whether a new offset time $\delta T$ is within a tolerable range wherein $R_o$ is the radius of the earth.

6. A position measuring system as claimed in claim 3, wherein the estimated coordinates X, Y and Z are multiplied by a weight factor k so that kX, kY and kZ form corrected coordinates of the vehicle.

7. A position measuring system as claimed in claim 1, further comprising a route guiding unit connected to the second computing means for receiving a signal therefrom and connected to the memory means for outputting thereto a signal indicating the present position for the vehicle, thereby guiding the path of the vehicle.

* * * * *